United States Patent
Choe (10) Patent No.: US 7,814,185 B2
(45) Date of Patent: Oct. 12, 2010

(54) PREFIX AGGREGATION ALGORITHM FOR ROUTING COORDINATION PROTOCOL IN A LOOSELY COUPLED MASSIVELY PARALLEL ROUTER

(75) Inventor: Myongsu Choe, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1504 days.

(21) Appl. No.: 10/283,363

(22) Filed: Oct. 30, 2002

(65) Prior Publication Data

US 2003/0084187 A1    May 1, 2003

Related U.S. Application Data

(60) Provisional application No. 60/330,812, filed on Oct. 31, 2001.

(30) Foreign Application Priority Data

Oct. 18, 2002    (KR)    ............... 10-2002-0063793

(51) Int. Cl.
  G06F 15/177    (2006.01)
  G06F 15/18    (2006.01)
  G06F 17/00    (2006.01)

(52) U.S. Cl. .................... 709/221; 706/12; 706/14; 706/45; 345/589

(58) Field of Classification Search .......... 709/221; 706/12, 14, 45; 345/589
See application file for complete search history.

(56) References Cited

U.S. PATENT DOCUMENTS

| | | | | |
|---|---|---|---|---|
| 4,868,743 A | * | 9/1989 | Nishio | 707/3 |
| 5,202,986 A | * | 4/1993 | Nickel | 707/3 |
| 5,940,396 A | * | 8/1999 | Rochberger | 370/408 |
| 6,061,712 A | * | 5/2000 | Tzeng | 709/202 |
| 6,067,574 A | * | 5/2000 | Tzeng | 709/247 |
| 6,509,898 B2 | * | 1/2003 | Chi et al. | 345/440 |
| 6,577,418 B1 | * | 6/2003 | Boivie | 398/48 |
| 6,754,626 B2 | * | 6/2004 | Epstein | 704/235 |
| 6,772,223 B1 | * | 8/2004 | Corl et al. | 709/238 |
| 7,072,876 B1 | * | 7/2006 | Michael | 706/45 |

OTHER PUBLICATIONS

*The New Shorter Oxford English Dictionary on Historical Principles*, Lesley Brown, vol. 2, Third Edition 1993, pp. 3665.

* cited by examiner

*Primary Examiner*—Philip C Lee
(74) *Attorney, Agent, or Firm*—H.C. Park & Associates, PLC (57) ABSTRACT

A prefix aggregation technique for coordination protocol in a router includes the forming of a prefix tree from a plurality of nodes in a first unit managing a routing table, each node including a prefix, depth, a color field, and at least three pointers including a first pointer to a parent node, a second pointer to a left child node, and a third pointer to a right child node, routing from a first node to a second node according to the prefix, and aggregating a certain node from the plurality of nodes according to the color field. The present invention also includes the inserting of a new prefix into a certain node according to the prefix, depth and color field. The node can also be deleted according to the prefix.

23 Claims, 8 Drawing Sheets

PREFIX AGGREGATION ALGORITHM FOR ROUTING COORDINATION PROTOCOL IN A LOOSELY COUPLED MASSIVELY PARALLEL ROUTER

CLAIM OF PRIORITY

This application makes reference to, incorporates the same herein, and claims all benefits accruing under 35 U.S.C. §119 from a provisional application entitled A PREFIX AGGREGATION ALGORITHM FOR COORDINATION PROTOCOL IN A LOOSELY COUPLED MASSIVELY PARALLEL ROUTER earlier filed under 35 U.S.C. §111(b) in the United States Patent and Trademark Office on the day of Oct. 31, 2001 and there duly assigned Ser. No. 60/330,812, and a patent application also entitled A PREFIX AGGREGATION ALGORITHM FOR COORDINATION PROTOCOL IN A LOOSELY COUPLED MASSIVELY PARALLEL ROUTER filed in the Korean Industrial Property Office on the day of Oct. 31, 2001 and there duly assigned Serial No. 2002-63793.

BACKGROUND OF THE INVENTION

1. Field of the Invention

The present invention relates to a technique for a network device, and more particularly, to a prefix aggregation technique for routing coordination protocol in a loosely coupled massively parallel router.

2. Description of the Related Art

Special purpose devices have been used to handle data on networks. Routers, switches, hubs, and bridges for example have become very important devices with the rise of the Internet user and the rise of the traffic according to the Internet in general. A router is basically a device that routes messages between different networks. The router forwards data packets from one network such as a local area network (LAN) or wide area network (WAN) to another. Based on routing tables and routing protocols, routers read the network address in each transmitted frame and make a decision on how to send it based on the most expedient route (traffic load, line costs, speed, bad lines, etc.). Routers work at layer 3 in the protocol stack, whereas bridges and switches work at layer 2.

As the traffic on networks has increased, the process ability to determining the designated route of each message has become more important because greater speed and efficiency is needed to handle greater volume of data at faster rates. There is a need to significantly save the routing table space at each router which constructs a loosely coupled massively parallel router and reduce traffic between routers or software modules in a router architecture.

SUMMARY OF THE INVENTION

It is therefore an object of the present invention to reduce the traversing time in a routing table and message traffic.

It is another object to save the routing table space at each router which constructs a loosely coupled massively parallel router and traffic between routers significantly.

It is yet another object to provide an efficient aggregation technique for a protocol implementation in a general router.

It is still yet another object to provide a technique that increases the efficiency of a router.

It is another object to provide a loosely coupled massively parallel router that can reduce traffic between routers or between an input-output processor and switch module in a router architecture and yet be easy to implement.

To achieve the objectives of the present invention, there is provided a prefix aggregation algorithm for routing coordination protocol in a loosely coupled massively parallel router including the forming of a prefix tree from a plurality of nodes in a first unit managing a routing table, each node including a prefix, depth, a color field, and at least three pointers including a first pointer to a parent node, a second pointer to a left child node, and a third pointer to a right child node, routing from a first node to a second node according to the prefix, and aggregating a certain node from the plurality of nodes according to the color field.

The present invention also includes the inserting of a new prefix into a certain node according to the prefix, depth and color field. The node can also be deleted according to the prefix.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
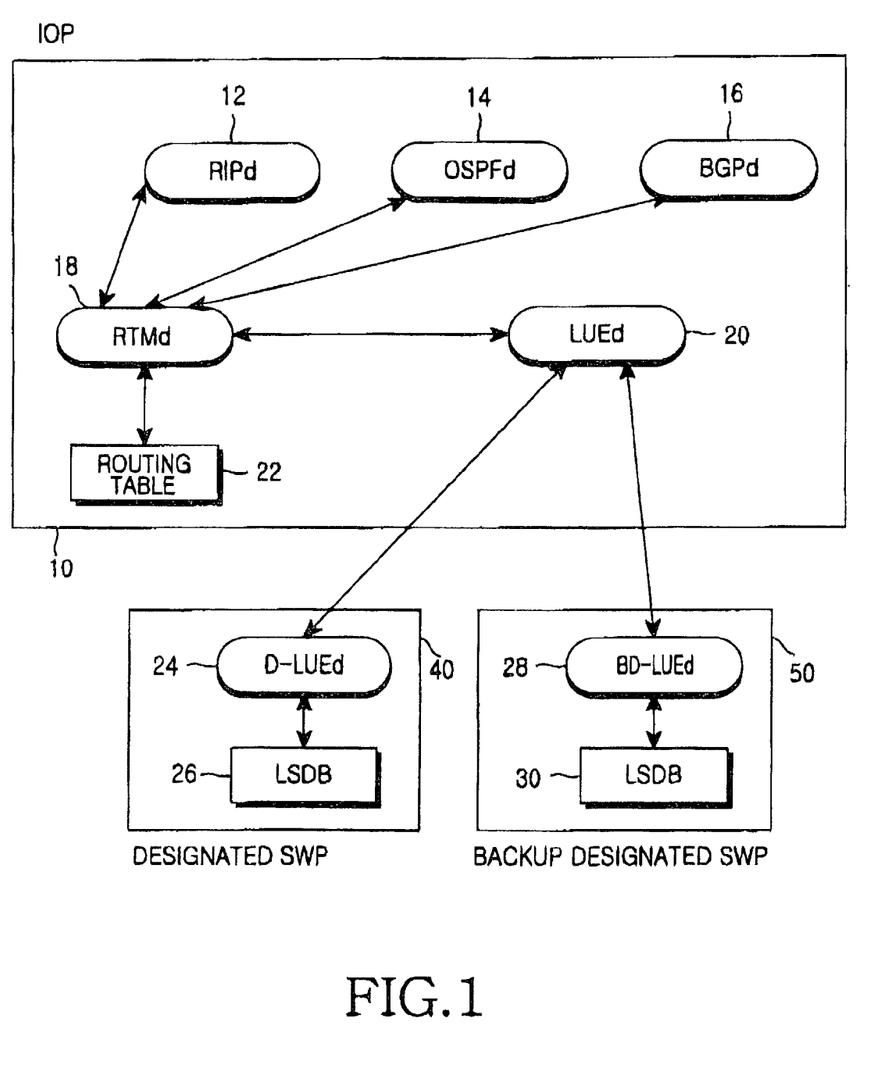
FIG. 1 shows interactions between software modules at a loosely coupled massively parallel router system.

Turning now to the drawings, interactions between software modules in a loosely coupled massively parallel router are shown in FIG. 1. At each IOP (Input-Output Processor) board 10, routing daemons such as RIPd 12, OSPFd 14, and BGPd 16 mutually exchange routing information generated by their own routing protocol RTMd (Routing Table Management daemon) 18 where the RTMd 18 manages a routing table 22. The LUEd 20 at the IOP 10 has a connection to the RTMd 18 via socket communication. At each SWP (Switch Processor) board, Designated LUEd (D-LUEd) 24 (at the designated switch processor 40) and Backup designated LUEd (BD-LUEd) 28 (at the backup designated switch processor 50) collect each IOP's routing information and broadcast it to all of the IOPs in order to have consistent information. To accomplish this task, the D-LUEd 24 and BD-LUEd 28 one must have a consistent LSDB (link state database) 26 and 30 respectively. For convenience, in FIG. 1, only one IOP 10 is connected with the designated SWP 40 and the backup designated SWP 50. But IOPs can be connected with them.

Unlike the other routing software modules, the LUE daemon does not maintain its own routing table because it only performs coordination and synchronization among routing tables at IOPs. Besides, it maintains for all the IOPs to have a globally consistent routing table as if all the IOPs are apparently working as one router in terms of user's view.

Figure 2:
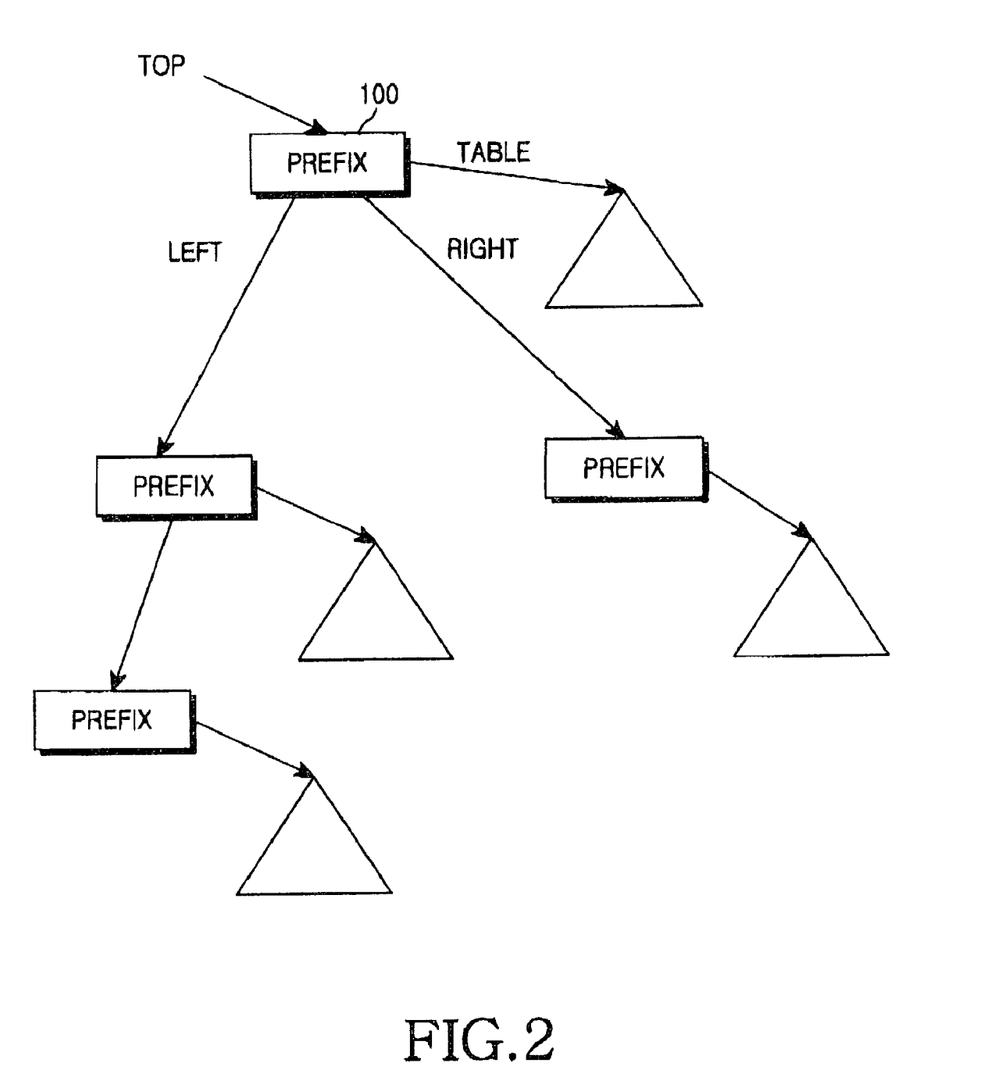
FIG. 2 shows a routing table in a loosely coupled massively parallel router.

FIG. 2 shows the structure of a routing table at a loosely coupled massively parallel router. Basically, it is represented as a tree structure where each node has prefix structure 100 and pointers to its left child, right child, and its parent. In addition, the routing node also links its routing table in a self-referential way.

The RTMd 18 routing table manager has to send its routing table to the D-LUEd 24 and BD-LUEd 28 whenever the routing table is changed from the external network configuration. In this case, the RTMd 18 traverses the routing table illustrated in FIG. 2 and sends it to the LUEd 20. To reduce the traversing time in a routing table and message traffic among LUEd 20 and D-LUEd 24 (or BD-LUEd 28), the present invention introduces an aggregation scheme (or route).

Figure 3A:
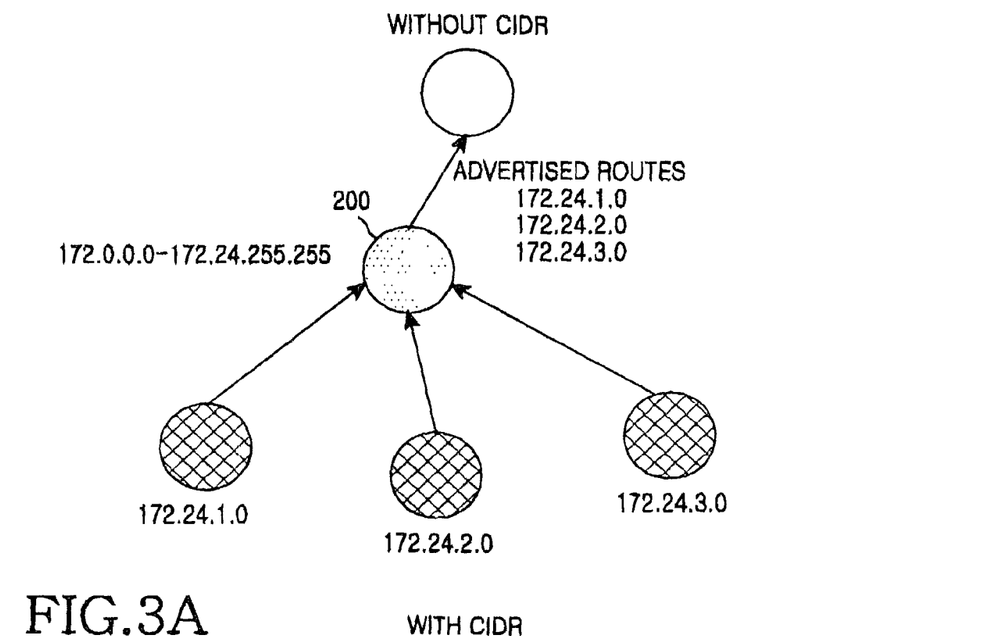
FIG. 3A shows a route advertisement without using an aggregation scheme.
Figure 3B:
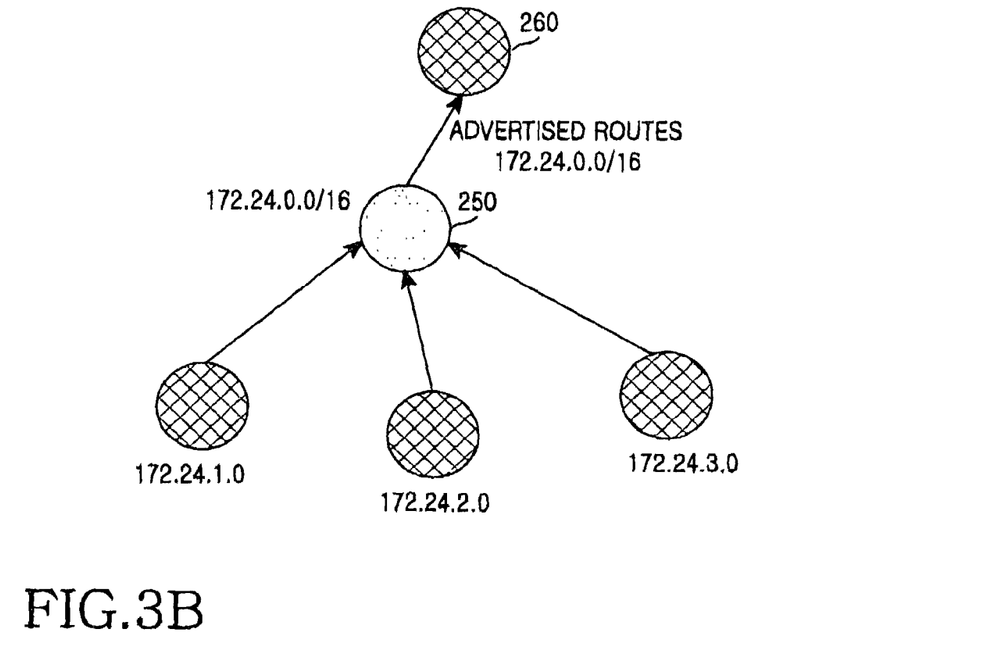
FIG. 3B shows a route advertisement using an aggregation scheme.

FIGS. 3A and 3B together show a comparison between using aggregation and not using aggregation. FIG. 3A shows route advertisement without using an aggregation scheme. For example, the router 200 must contain route entries from 172.0.0.0 through 172.24.255.255. To advertise its stored route entries, it has to send 172.24.1.0, 172.24.2.0, and 172.24.3.0 altogether. On the other hand, FIG. 3B shows the case where an aggregation scheme (or with CIDR (Classless Inter-Domain Routing)) is used. The router 250 aggregates only a single route 172.24.0.0/16 and only 172.24.0.0/16 is sent to the other router 260. It can save the routing table space at each router and traffic between routers significantly. In other words, the router that aggregates route entries keeps all the routing entries in its own routing table and sends only one route entry.

Therefore, an aggregation scheme using a prefix tree, a variant of radix tree, is preferred.

Figure 4:
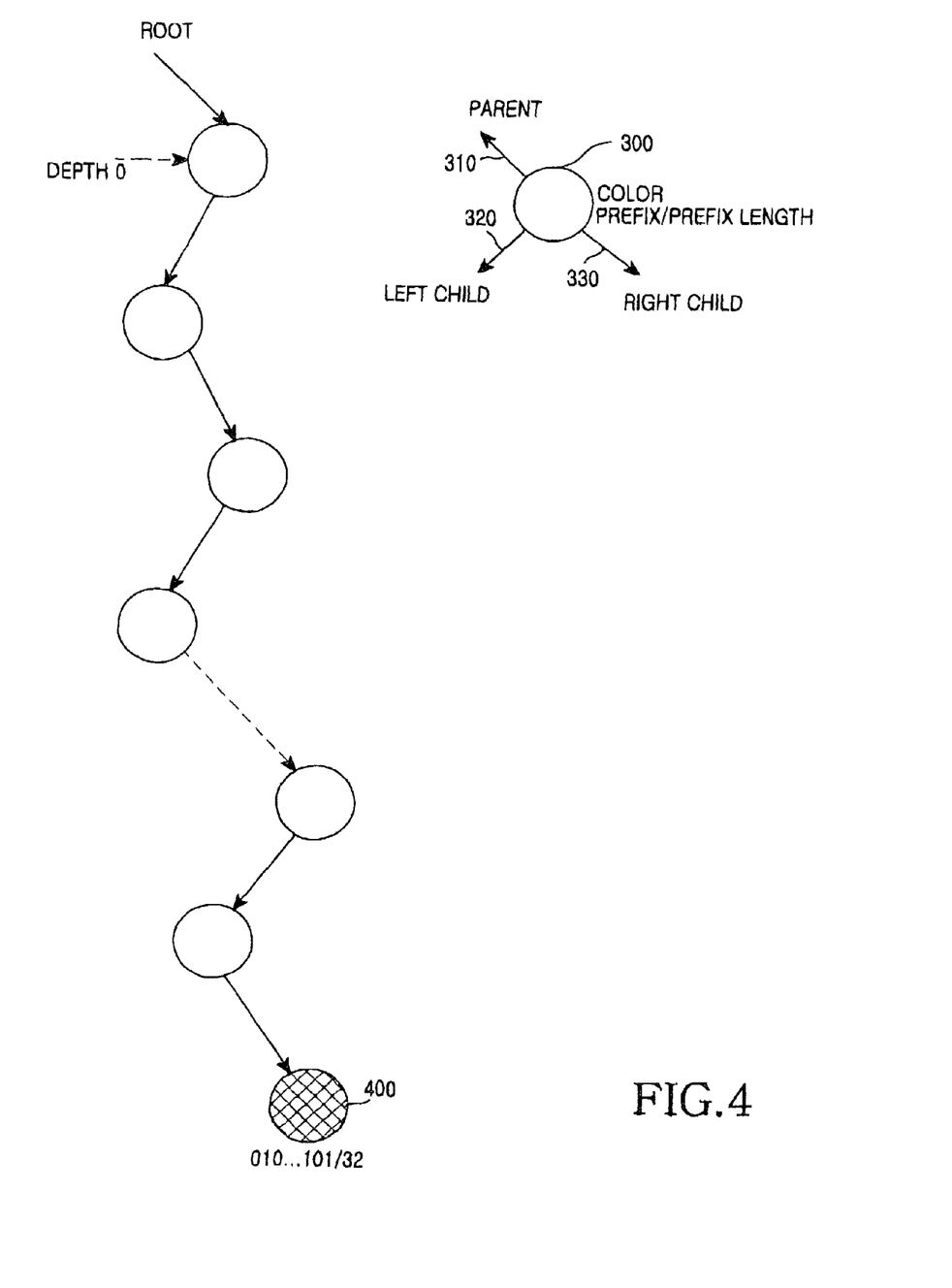
FIG. 4 shows a prefix tree.

Referring to FIG. 4, when route entries are updated at a routing table, the RTMd 18 maintains additional data structure called a prefix tree. The prefix tree is defined as the tree in which each node 300 has a color field, prefix, and prefix length and three pointers to parent 310, left child 320, and right child 330. It is named as a prefix tree because each leaf node contains prefix and prefix length. From the root node of the tree, when it starts 0 bit from the first bit of the prefix (route), it links to its left child or when it starts bit 1 from the first bit of the prefix, it connects to its right child. It is traversed from the first bit until it reaches to the node matched to the last bit. When the final node 400 is reached, the final node 400 sets its color as gray from white to denote that it is is the node with prefix or it is the node to be aggregated later. The color is unimportant itself, but the distinction caused by color is important. When the route is updated at the routing table, the changes will be applied to the prefix tree at the same time by guaranteeing the consistent routing information. At each IOP, when a route entry is updated, the route entry has to be changed at each routing table and its prefix tree respectively. Only aggregated route entries are transferred to the D-LUEd 24.

Figure 5:
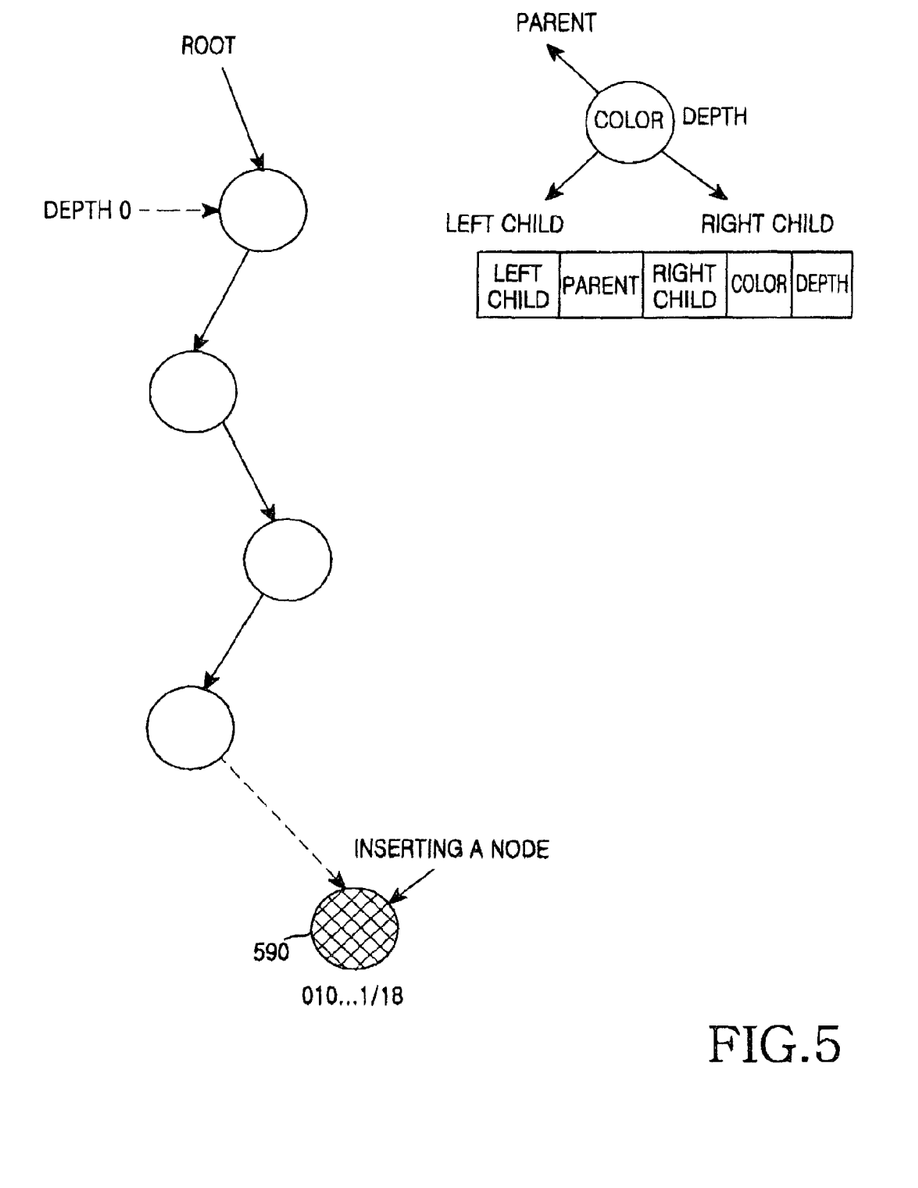
FIG. 5 shows the building of a prefix tree.

FIG. 5 shows how the prefix tree is constructed. Each prefix is constructed on the basis of interfaces. Each node contains 3 pointers, prefix, and depth (or prefix length). When prefix 010_1/18 is inserted, the first bit is 0. Thus the traversal is going to the left node because "0" means left-link and "1" right-link. After arriving to the last node where the last bit (18-th bit) is 1, the corresponding node as the leaf is constructed. The node 590 is filled out with the prefix and its depth and it is colored as gray.

Figure 6:
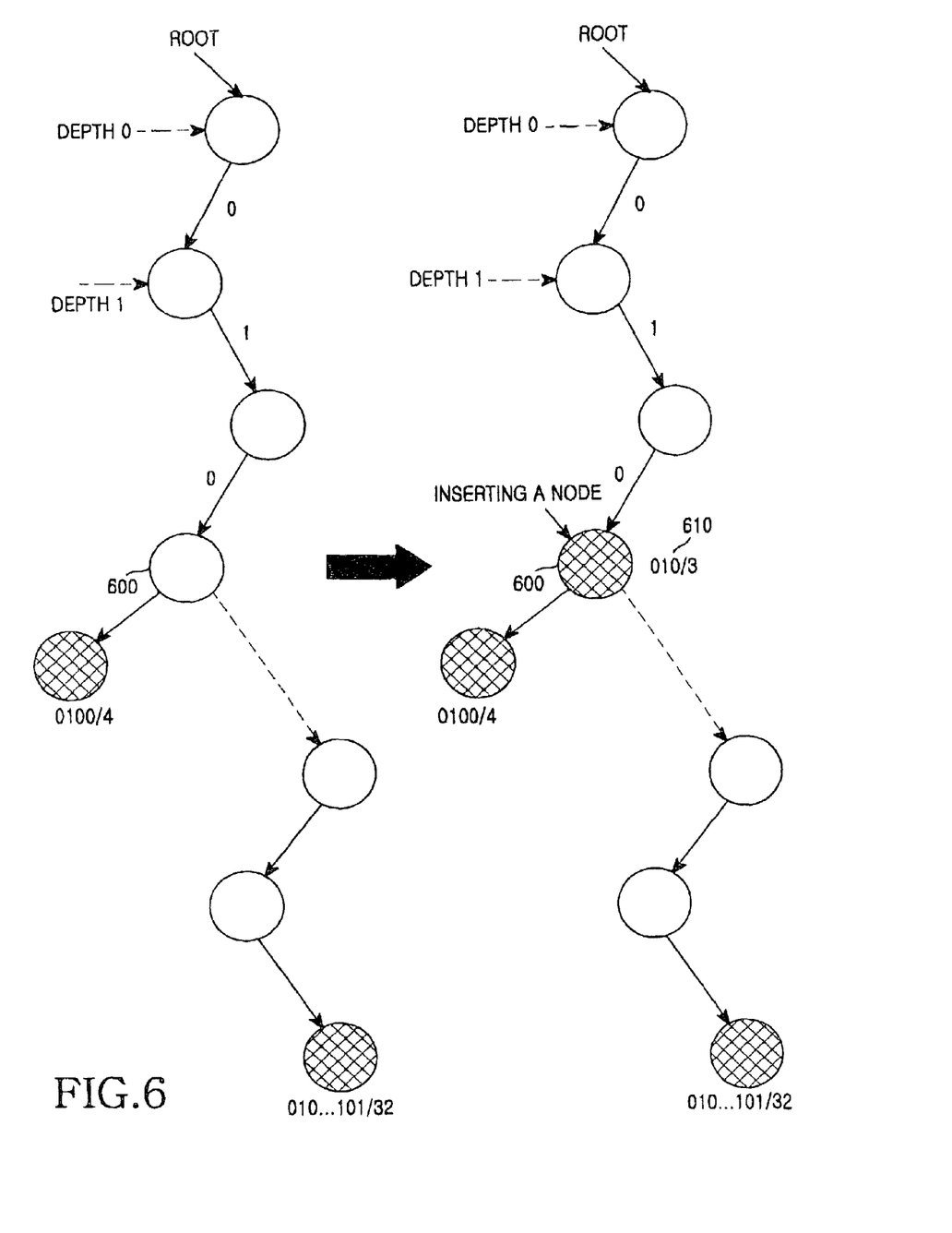
FIG. 6 shows the inserting of a node.

FIG. 6 shows how a new prefix is inserted at the present prefix tree. A prefix 010/3 (reference 610) is to be inserted in the tree. By using the same traversing rule, it arrives at the node 600, in which it has white color and null prefix and depth. Then, the node 600 fills out its prefix and length and turns its color into gray.

Figure 7:
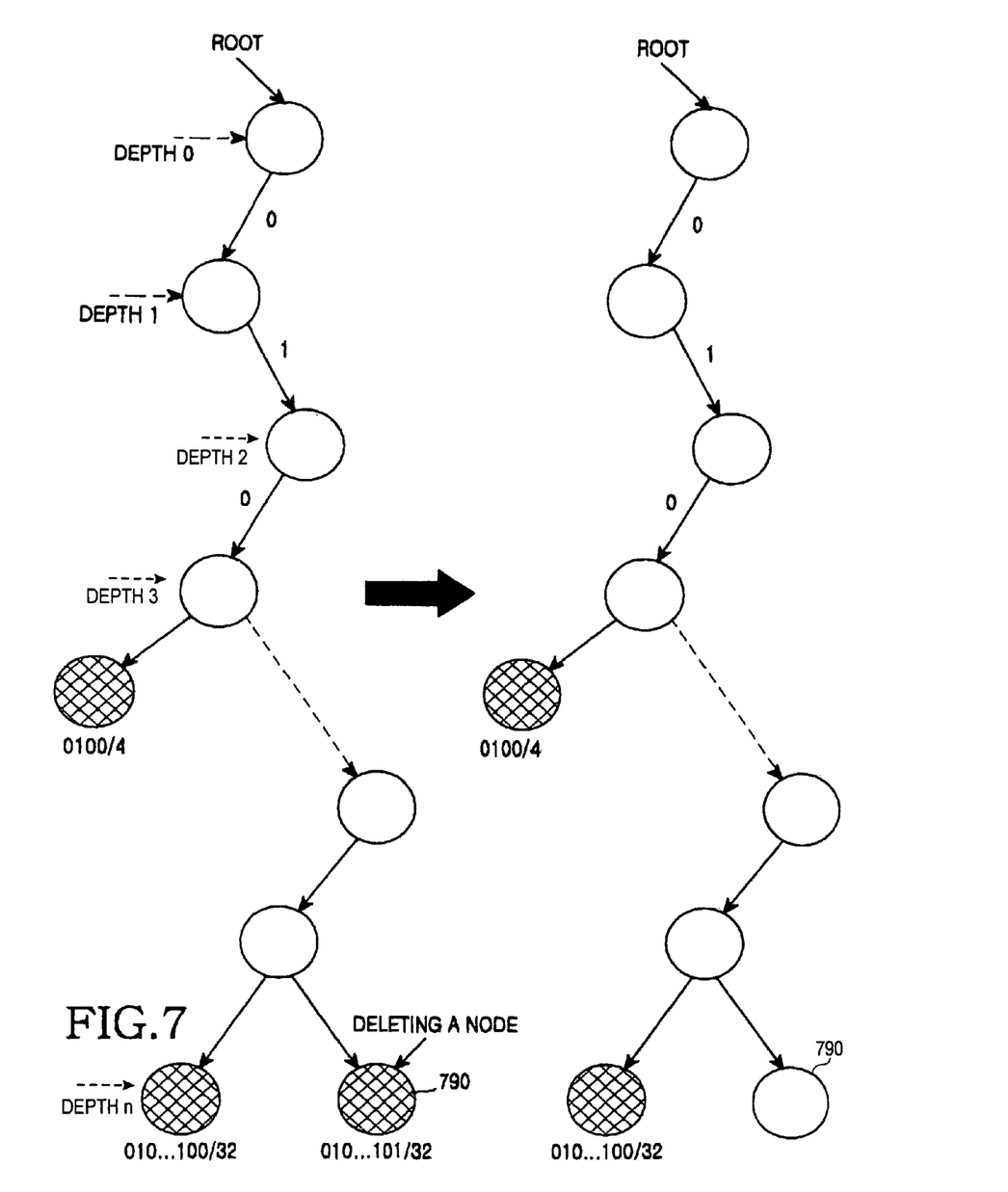
FIG. 7 shows of deleting a node.

FIG. 7 shows how a prefix is deleted from a node of the prefix tree. From the shown example, a node 790 with prefix 010_101/32 is to be deleted. To delete a node with the prefix, it has to be traversed to match the node. When the node is found and the prefix is matched to the to-be-deleted prefix, the node is de-colored from the prefix tree, i.e., from gray to white.

Figure 8:
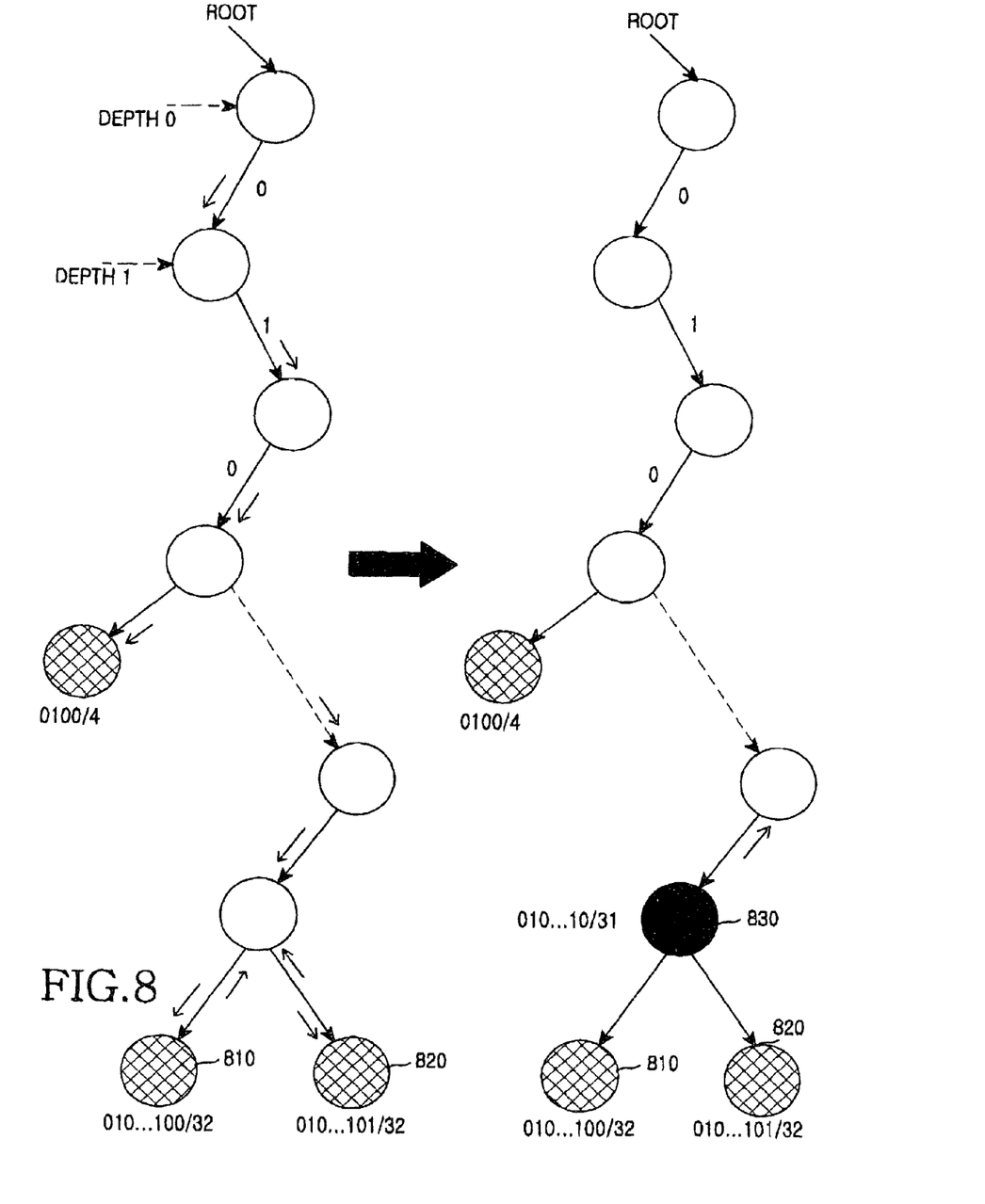
FIG. 8. shows the aggregating of a prefix tree.

In FIG. 8, an aggregation scheme is shown in the same prefix tree. The traversal of the prefix tree is based on a post-order traversal. The nodes with 010_100/32 (reference 810) and 010_101/32 (reference 820) are visited and they already have gray color. In this case, both of the nodes can be aggregated and shrunk to the node (830) with 010_10/31 where the node has to have its color changed to black from gray and be filled out with its prefix and length on the node. The aggregation scheme is recursively continuing until the traversal is reached to the root node.

The aggregation scheme is designed to focus the reduction of the traffic among IOPs and SWMs. To solve this problem, as shown above, a prefix tree and coloring scheme are disclosed with generic applicability.

A prefix tree is proposed which has a node with prefix, length and color field. As shown above, there is the construction, insertion, deletion, and aggregation of the prefix tree.

To make a distinction on each node in a prefix tree, a coloring scheme is used to indicate which node will be aggregated when the aggregation, insertion, and deletion operations are performed. The traversal is based on a post-order traversal. The coloring scheme helps to maintain the updates of the prefix tree without degenerating its structure.

The present invention has generic applicability. Currently, most of the routing protocols are required to support a CIDR (Classless Inter-Domain Routing) scheme. In this case, an efficient aggregation scheme is needed for each protocol implementation. The above mentioned technique of the present invention can be applicable to LUE (Loosely Coupled Unified Environment) and any other routing protocols in a router.

The present invention can significantly reduce routing relevant traffic between IOP and SW modules, inherent from a routing coordination protocol called LUE in a massively parallel router. In addition, the invention can be used in any other implementation of routing protocols such as BGP-4 (border gateway protocol) and OSPF (open shortest path first) where CIDR (Classless Inter-Domain Routing) scheme is required and supported. The use of an efficient aggregation scheme is critical for a router to save routing table and forwarding table and to reduce traffic between routers or between IOP (Input-Output Processor) and SW module in router architecture.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A method, comprising the steps of: forming a prefix tree from a plurality of nodes in a first unit managing a routing table, each node of the plurality of nodes including a prefix, depth, a color field, and at least three pointers including a first pointer to a parent node, a second pointer to a left child node, and a third pointer to a right child node, with the color field comprising at least a first color, a second color and a third color; traversing from a first node to a second node according to the prefix; and changing the color field of a certain parent node from the first color to the third color when aggregating the child nodes if the color fields of the child nodes are the second color, with the color field indicating when aggregation, insertion, and deletion operations of the prefixes of the plurality of nodes are performed.

2. The method of claim 1, further comprising the step of inserting a new prefix into a certain node according to the prefix, depth and color field.

3. The method of claim 2, further comprising the step of deleting the prefix from the certain node.

4. The method of claim 1, further comprising the step of deleting the prefix from a certain node.

5. The method of claim 3, the step of deleting the prefix from the certain node further comprising the step of traversing the prefix tree to the certain node having the prefix matching a chosen prefix to be deleted.

6. The method of claim 5, with the traversal being a post-order traversal.

7. The method of claim 4, the step of deleting the prefix from the certain node further comprising the step of traversing the prefix tree to the certain node having the prefix matching a chosen prefix to be deleted.

8. The method of claim 7, further comprising the steps of: inserting a new prefix by traversing to the certain node according to the prefix, the certain node having the first color of the color field, a null prefix and depth; and filling out the prefix and depth of the certain node, and turning the color field to the second color.

9. The method of claim 8, with the traversal being a post-order traversal.

10. The method of claim 1, further comprising the steps of:
inserting a new prefix by traversing to a certain node according to the prefix, the certain node having the first color of the color field, a null prefix and depth; and
filling out the prefix and depth of the certain node, and turning the color field to the second color.

11. The method of claim 1, with the traversal being based on a post-order traversal.

12. An apparatus, comprising:
a memory; and
a first unit managing a routing table and including a prefix tree comprising a plurality of nodes including a color field, prefix, prefix length, and a plurality of pointers including a first pointer to a left child, a second pointer to a right child, and a third pointer to a parent, the color field indicating which node will be aggregated, the prefix indicating the route taken from a first node to a second node being either a left child or right child, the color field of the node being changed in dependence upon the aggregation, and
when a parent node has two child nodes having same color field indicating that the child nodes are to be aggregated, with the color field indicating when aggregation, insertion, and deletion operations of the prefixes of the plurality of nodes are performed, the first unit aggregating the two child nodes and changing the color field of the parent node.

13. The apparatus of claim 12, further comprised of the first node accommodating a prefix added.

14. The apparatus of claim 12, further comprising:
the memory including the first unit with the prefix tree; and
a controller managing the first unit in an internet protocol switch.

15. A method, comprising the steps of: forming a prefix tree from a plurality of nodes in a first unit managing a routing table, each node of the plurality of nodes including a prefix, depth, a color field, with the color field of each node in the subset of the nodes indicating whether or not this node is to be aggregated, with the color field comprising at least a first color, a second color and a third color;
traversing from a first node to a second node according to the prefix; and
when a parent node has two child nodes having same color field indicating that the child nodes are to be aggregated, with the color field indicating when aggregation, insertion, and deletion operations of the prefixes of the plurality of nodes are performed, aggregating the two child nodes and changing the color field of the parent node.

16. The method of claim 15, with the traversal being based on a post-order traversal.

17. The method of claim 16, further comprising the step of inserting a prefix into a certain node by inserting a new prefix into the certain node according to the prefix, depth and color field.

18. The method of claim 16, further comprising the step of deleting the prefix from the certain node, with the certain node being selected to match the prefix.

19. The method of claim 17, with the aggregation being recursively performed in the prefix tree until the traversal reaches a root node.

20. The method of claim 1, further comprising the steps of:
inserting a new prefix into a certain node by traversing to the certain node according to the prefix and filling out a prefix length of the certain node and changing the color field of the certain node; and
deleting the prefix from the certain node by traversing to match the prefix, when the certain node is found and the prefix is matched to the to-be-deleted one, the color field of the matched node is changed from the first color to the third color.

21. The method of claim 1, wherein aggregating a certain node further comprising of traversal of the prefix tree according to a post-order traversal, where the certain node has its color field changed from the first color to the second color, from the second color to the first color, or from the third color to the first color in dependence upon inserting or deleting the prefix, or aggregating of the plurality of nodes, and be filled out with its prefix and length on the node, recursively continuing until the traversal reaches a root node.

22. A method, comprising the steps of:
forming a prefix tree from a plurality of nodes in a first unit managing a routing table, each node of the plurality of nodes including a prefix, depth, a color field; and
traversing from a root node to a certain node according to the prefix, with the root node being a node without any parent node,
with the color field including at least a first color, a second color and a third color,
with the color field of the certain node being changed from the second color to the first color in dependence upon deleting the prefix from the certain node, being changed from the first color to the second color in dependence upon inserting a new prefix into the certain node, or being changed from the first color to the third color in dependence upon aggregating a plurality of child nodes of the certain node into the certain node when the child nodes of the certain node have same color field indicating that the child nodes are to be aggregated,
with the color field indicating which node will be aggregated and when the aggregation, insertion, and deletion operations of the prefixes of the plurality of nodes are performed, and
with the traversal being a post-order traversal.

23. A method, comprising the steps of:

forming a prefix tree from a plurality of nodes in a first unit managing a routing table, each node of the plurality of nodes including a prefix, depth, a color field, and at least three pointers including a first pointer to a parent node, a second pointer to a left child node, and a third pointer to a right child node;

traversing from a first node to a second node according to the prefix, with the color field including at least a first color, a second color and a third color, accommodating a distinction on each node of the prefix tree with the color fields to indicate which node will be aggregated and when the aggregation, insertion, and deletion operation of the prefixes of the plurality of nodes are performed, with the traversal based on post-order traversal, with the color fields maintaining updates of the prefix tree; and when a parent node has two child nodes having the second color indicating that the child nodes are to be aggregated, aggregating the two child nodes into the parent node and changing the color field of the parent node from the first color to the third color.

* * * * *